United States Patent Office 2,911,090
Patented Nov. 3, 1959

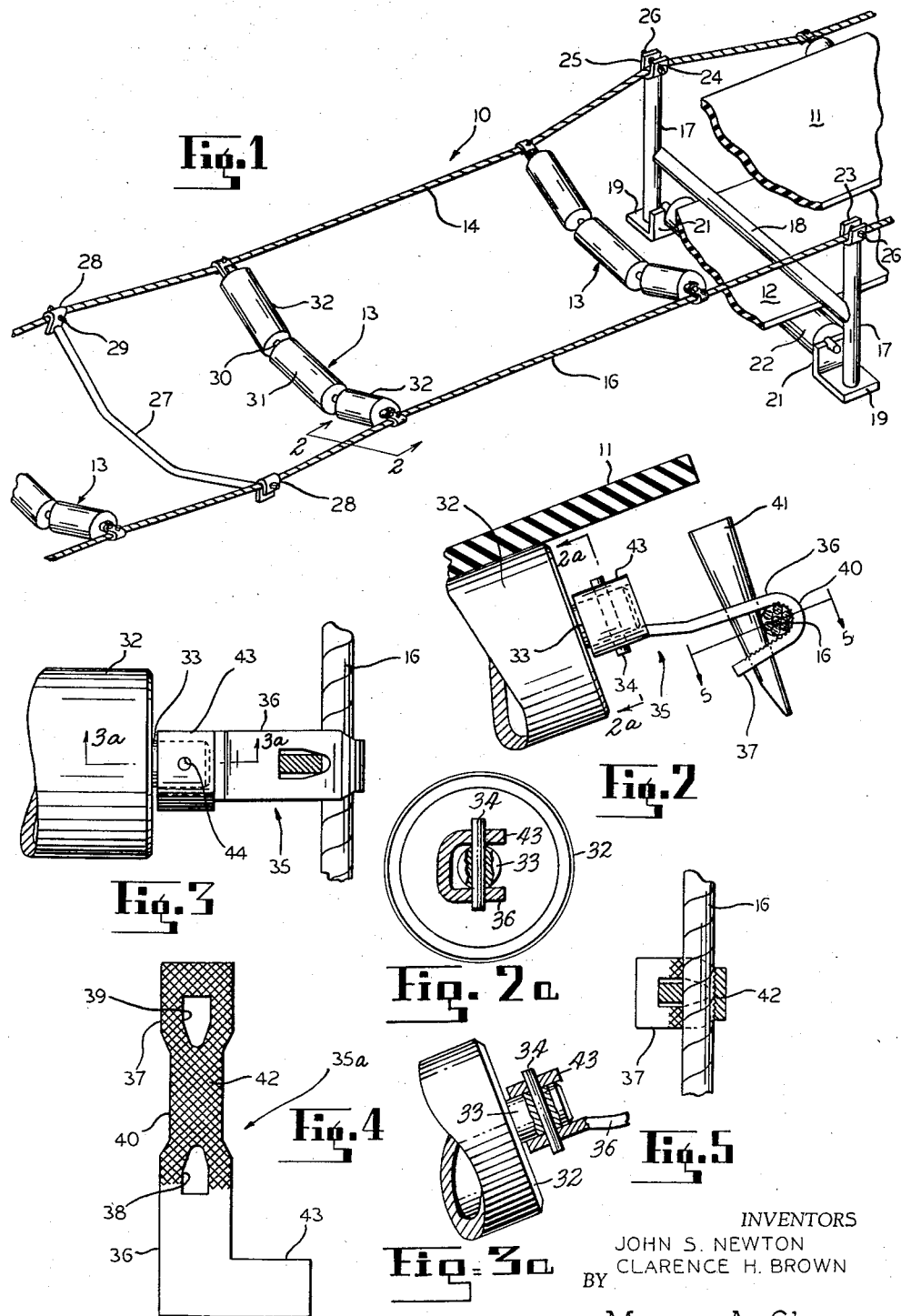

2,911,090
ROPE CLAMP FOR TROUGHING ROLLER ASSEMBLY

John S. Newton, Glen Ellyn, and Clarence H. Brown, Chicago, Ill., assignors to Goodman Manufacturing Company, Chicago, Ill., a corporation of Illinois Application September 4, 1957, Serial No. 681,946

4 Claims. (Cl. 198—192)

This invention relates generally to improvements in belt conveyors of the type where the conveying reach is supported upon spaced flexible strands, and more particularly to a clamp for mounting the troughing roller assembly spanning distance between spaced strands.

Among more recent improvements in the art of belt conveying equipment such as is shown in Craggs et al. Patent No. 2,773,857, the load of the conveying reach is transmitted by the flexible troughing roller assemblies into the laterally spaced flexible support strands. If for some reason the belt becomes misaligned, the loaded conveying reach will not be centered on the troughing roller assembly and will move beyond the ends of the wing rollers of the roller assembly. Such wing roller is flexibly connected to a bracket secured to the support strand by means of a spike or wedge passing through aligned openings in the spaced limbs of the mounting bracket. When the belt is misaligned the clamping spike gets into the way of the edge of the belt with the consequent damage thereto. It is to the prevention of such damage to the belt edge that this invention is particularly directed.

According to the present invention, the upper limb of the two limbs embracing the rope strand is provided with an extension which is bent into a position in spaced relationship to the upper limb. The so bent over extension and the upper limb provide an anchor point for the shaft of the wing roller, the shaft center extended passing above the center of the rope strand.

One of the principal objects of this invention is to provide new apparatus for mounting a troughing roller assembly to the flexible support strands, said apparatus being characterized by the locking means therefor being out of the way of the conveying reach when the same becomes misaligned.

Other objects and important features of the invention will be apparent from a study of the specification following taken with the drawing which together describe and illustrate a preferred embodiment of the invention and what is now considered to be the best mode of practicing the principles thereof. Other embodiments may be suggested to those having the benefit of the teachings herein and such other embodiments are intended to be reserved especially as they fall within the scope and purview of the subjoined claims.

In the drawing:

Fig. 1 is a perspective view of a flexible strand supported belt conveyor, said conveyor having the improvements according to the present invention embodied therein;

Fig. 2 is an elevational view of a rope clamp according to the present invention, said view being taken in the direction of the arrows 2—2 of Fig. 1;

Fig. 2A is a section taken along the line 2A—2A of Fig. 2 looking in the direction of the arrows;

Fig. 3 is a plan view of the rope clamp seen in Fig. 2;

Fig. 3A is a section taken along the line 3A—3A of Fig. 3 looking in the direction of the arrows;

Fig. 4 is a plan view of a blank used in forming the clamp seen in Figs. 2 and 3; and Fig. 5 is a view taken in the direction of the arrows 5—5 of Fig. 2.

Referring now to the drawing, the improvements according to the present invention are embodied in a conveyor indicated generally by the reference numeral 10 and having a conveying reach 11 and a return reach 12. Conveying reach 11 is supported upon troughing roller assemblies, each indicated generally by the reference numeral 13, each assembly being suspended between laterally spaced flexible support strands or ropes 14 and 16. Strands 14 and 16 are supported at intervals throughout their length upon vertical standards 17, 17, the standards 17, 17 being maintained in spaced apart relationship by means of a spreader or strut 18.

Each of the standards 17 has an angle foot 19, and upstanding leg 21 thereof providing a support for a return idler 22 for the return reach 12. As seen in Fig. 1 the upper ends of the standard 17 are provided with a U-shaped saddle 23, each of the limbs 25 of the U saddle having an aperture 24 therein for a locking spike or wedge 26 for the support strands.

The spaced support strands 14 and 16 are maintained in properly spaced apart relationship between the spaced standards 17 by means of a spreader 27 having its ends provided with U-shaped brackets 28 similar to the U-shaped saddle 23 atop the standard 17. Brackets 28 likewise have the limbs thereof provided with aligned apertures for receiving a locking spike 29 clamping the strands 14 or 16 in the bracket 28.

Each of the troughing roller assemblies 13 consists of a center load supporting roller 31 and inclined wing or troughing rollers 32 flanking the center roller 31. These are articulately connected together as at 30.

Referring to Figs. 2 and 3 of the drawing, each of the wing rollers 32 turns upon an idler shaft 33, the wing roller 32 being articulately connected to a clamp 35, constructed according to the present invention, for movement in a horizontal plane upon a pin 34.

Referring also to Fig. 4 of the drawing, the mounting bracket 35 is formed from a punched piece of stock 35a in the manner shown, and is bent as seen in Fig. 2 to provide an upper limb 36 and a lower limb 37 connected at a bight 40 embracing the wire rope 14 or 16. Upper limb 36 has an aperture 38 therein, and lower limb 37 has an aperture 39, the two apertures 38 and 39 being aligned to receive a locking pin or spike 41, the taper of the pin firmly wedging the strand into the bight formed by the upper and lower limbs 36 and 37.

As seen in Fig. 4 the lower limb 37 and the bight 40 are provided with file grooves 42, see also Fig. 5, which tightly grip the rope strand 16.

As seen in Fig. 4 the blank 35a has its upper limb 36 provided with an extension 43 therefrom. The extension 43 is bent in position over the upper limb 36 in such a fashion that the extension 43 is spaced above the limb 36. After being so formed, the extension 43 and limb 36 are drilled as at 44 to provide a pair of aligned holes for the rivet pin 34. The mounting bracket 35 is case hardened after forming as seen in Figs. 2 and 3 so that file grooves 42 are hard enough to grip the wire ropes firmly.

It may be noted that a plane through the top surface of the wing roller 32 and normal to the axis to the pivot pin 34 lies above the axis of the rope 16. Also the shaft center extended of roller 32 extends above the rope strand 16 thus maintaining the edge of the conveying reach 11 out of the way of the support bracket 35. When the conveying reach 11 becomes misaligned for any reason it is thus possible for it to clear the upper end of the locking pin 41. It may also be noted that all of the elements making up the rope clamp lie well below the top surface of the wing roller 32, so that at no time is there any interference with the edge of the conveying reach.

While the invention has been described in terms of a preferred embodiment thereof its scope is intended to be limited only by the claims here appended.

We claim as our invention:

1. In a belt conveyor of the type where the load on the conveying reach is transfererd from a troughing roller assembly into a pair of spaced flexible strands, a troughing roller adjacent each strand, the improvement in means for connecting said troughing roller assembly to said strands whereby said conveying reach may be misaligned without there being contact of the edge of said conveying reach with said connecting means which comprises a bracket having spaced upper and lower limbs and a connecting bight between said limbs, a pair of spaced apertures in said limbs, locking means received in said apertures for wedging said strand into said bight, means for providing a swivelable connection in a substantially horizontal plane for the end of said troughing roller assembly comprising an extension from said upper limb and extending over said upper limb, said extension and said limb providing means for supporting said last named swivelable connection, the turning axis extended of said troughing roller passing above said strand.

2. In a belt conveyor of the type where the load on the conveying reach is transferred from a troughing roller assembly into a pair of spaced flexible strands, a troughing roller adjacent each strand, the improvement in means for connecting said troughing roller assembly to said strands whereby said conveying reach may be misaligned without there being contact of the edge of said conveying reach with said connecting means which comprises a bracket having spaced upper and lower limbs and a connecting bight between said limbs, a pair of spaced apertures in said limbs, a locking pin received in said apertures for wedging said strand into said bight, means for providing a connection for the end of said troughing roller assembly comprising an extension from said upper limb and extending over said upper limb, said extension and said limb providing means for supporting said last named connection, the turning axis extended of said troughing roller passing above said spaced strand.

3. In a belt conveyor of the type where the load on the conveying reach is transferred from a troughing roller assembly into a pair of spaced flexible strands, the improvement in means for connecting said troughing roller assembly to said strands whereby said conveying reach may be misaligned without there being contact of the edge of said conveying reach with said connecting means which comprises a bracket having spaced upper and lower limbs and a connecting bight between said limbs, the inside surface of said bight being knurled for gripping said flexible strand, a pair of spaced apertures in said limbs, a locking pin received in said apertures for wedging said strand into said bight, means for providing a connection for the end of said troughing roller assembly comprising an extension from said upper limb and extending over said upper limb, said extension and said limb providing means for supporting said last named connection, the turning axis extended of said troughing roller passing above said strand.

4. In a belt conveyor of the type where the load on the conveying reach is transferred from a troughing roller assembly into a pair of spaced flexible strands, the improvement in means for connecting said troughing roller assembly to said strands whereby said conveying reach may be misaligned without there being contact of the edge of said conveying reach with said connecting means which comprises a bracket having spaced upper and lower limbs and a connecting bight between said limbs, a pair of spaced apertures in said limbs, a locking pin received in said apertures for wedging said strand into said bight, means for providing a connection for the end of said troughing roller assembly comprising an extension from said upper limb and extending over said upper limb, said extension and said limb providing means for supporting said last named connection, the turning center extended of said troughing roller passing above said strand.

References Cited in the file of this patent

UNITED STATES PATENTS

| | | |
|---|---|---|
| 1,958,412 | Andrada et al. | May 15, 1934 |
| 2,773,257 | Craggs et al. | Dec. 4, 1956 |